3,751,453
ALPHA-ACYLOXYACETIC ACID PRODUCTION
Victor P. Kurkov, San Rafael, Seymour J. Lapporte, Orinda, and William G. Toland, San Rafael, Calif., assignors to Chevron Research Company, San Francisco, Calif.
No Drawing. Filed Aug. 21, 1972, Ser. No. 282,516
Int. Cl. C07c 67/00
U.S. Cl. 260—494                12 Claims

ABSTRACT OF THE DISCLOSURE

α - Acyloxyacetic acids are produced as the major product by the reaction of formaldehyde, a carboxylic acid and carbon monoxide in the presence of catalytic amounts of a Group VIII noble transition metal compound and an iodide promoter.

DESCRIPTION OF THE PRIOR ART

The preparation of α-acetoxypropionic acid from acetaldehyde, carbon monoxide and acetic acid in the presence of acidic catalysts is disclosed in U.S. Pat. No. 2,265,945, issued on Dec. 9, 1941, to D. J. Loder.

The preparation of α-hydroxyacetic acid (glycolic acid) from formaldehyde, carbon monoxide and water in the presence of acidic catalysts at high pressures and temperatures is disclosed in Noller, "Chemistry of Organic Compounds," page 743, 2nd ed., 1957, W. B. Saunders Co., Philadelphia, Pa.

DESCRIPTION OF THE INVENTION

The catalyst system

The catalyst system employed in the process of the present invention comprises a rhodium compound and an iodide promoter.

Examples of suitable rhodium compounds include rhodium halides, such as $RhCl_3$, $RhBr_3$ and $RhI_3$; rhodium carbonyl halides, such as $Rh_2(CO)_4Br_2$, $Rh_2(CO)_4Cl_2$ and $Rh_2(CO)_4I_2$; and $Rh_2O_3$. Other suitable rhodium compounds are rhodium coordination compounds containing monodentate ligands, such as carbon monoxide, halides, amines, organophosphines, organoarsines and/or organostibines, i.e., rhodium compounds such as $Rh[(C_6H_5)_3P]_2(CO)I$ and $$RhCl(CO)[(C_6H_5)_3As]_2$$

The preferred rhodium compounds are rhodium halide and rhodium carbonyl halide compounds.

Suitable iodide promoters include iodine, hydrogen iodide (hydroiodic acid) and alkyl iodides of 1 to 6 carbon atoms and 1 to 3 iodide groups such as methyl iodide, ethyl iodide, methylene diiodide, iodoform, and isopropyl iodide.

Certain rhodium compounds such as $RhI[(C_6H_5)_3P]_3$ and $RhI_3$ incorporate iodide moieties so that a separate iodide promoter may not be required.

The catalyst system of a rhodium compound and an iodide promoter is a known catalyst combination and is disclosed, for example, in U.S. 3,579,551 issued to Craddock et al. on May 18, 1971. The disclosures of this patent are hereby incorporated by reference.

Molar ratios of the iodide promoter to the rhodium component of the catalyst system in the range of 1:1 to 2500:1 are generally suitable. However, the preferred molar ratios of iodide promoter to rhodium component are about 3:1 to 300:1 and the most preferred molar ratios are about 5:1 to 100:1.

Concentrations of the rhodium compound of the catalyst system in the reaction medium between $10^{-6}$ moles/liter and $10^{-1}$ moles/liter, are normally employed, with the preferred range being $10^{-4}$ moles/liter to $10^{-2}$ moles/liter. Higher concentrations even to the extent of 1 mole/liter may, however, be used if desired.

The concentration of the iodide promoter portion of the catalyst system in the reaction medium may vary widely over the broad concentration range of $10^{-6}$ mole/liter to 18 moles/liter, based on iodide atom. In the process of this invention, however, the preferred concentration range of promoter is $10^{-4}$ moles/liter to 2 moles/liter.

Although the catalyst system is generally employed as a homogeneous catalyst system, components of the catalyst system, e.g., the rhodium compound, may be dispersed on inert supports, such as silica or alumina, to provide a heterogeneous catalyst system.

The formaldehyde reactant

The formaldehyde reactant is suitably introduced in the pure form or produced in situ, e.g., from paraformaldehyde or trioxane. In the preferred modification of the process, the formaldehyde is provided in the form of trioxane.

The carboxylic acid reactant

The process of the invention is applicable to aliphatic and aromatic carboxylic acids of from 1 to 10 carbon atoms.

Preferred carboxylic acid reactants comprise alkanoic acids of 1 to 10 carbon atoms, dialkanoic acids of 3 to 10 carbon atoms, haloalkanoic acids of 1 to 10 carbon atoms and of 1 to 5 halogens of atomic numbers from 9 to 35 (fluorine, chlorine and bromine) and hydrocarbon aromatic acids of 7 to 10 carbons and 1 to 2 carboxy groups. The most preferred carboxylic acid reactants are alkanoic acids of 2 to 6 carbon atoms, especially acetic and propionic acids.

Representative alkanoic acids include formic, propionic, butyric, isobutyric, valeric, hexanoic, heptanoic, octanoic, decanoic, etc. Representative dialkanoic acids include malonic acid, succinic acid, adipic acid, etc. Representative haloalkanoic acids include trifluoroacetic, trichloroacetic, tribromoacetic, β,β,β-trichloropropionic acid, perchloropropionic acid, β-chloropropionic acid, β-bromopropionic acid, etc. Representative aromatic acids include benzoic, p-toluic acid, 2,4-dimethylbenzoic acid, o-phthalic acid, isophthalic acid, terephthalic acid, etc.

The α-acyloxyacetic acid product

The net reaction of the process of the invention is depicted in Equation 1.

$$R\overset{O}{\overset{\|}{C}}OH + CH_2O + CO \longrightarrow R\overset{O}{\overset{\|}{C}}OCH_2CO_2H \quad (1)$$

wherein $$R\overset{O}{\overset{\|}{C}}OH$$

represents the carboxylic acid reactant.

When the carboxylic acid reactant is a dicarboxylic acid, the carboxylic acid reactant may react with additional formaldehyde and carbon monoxide to form a mixture of products as depicted in Equation 2.

$$R\left(\overset{O}{\overset{\|}{C}}OH\right)_2 + CH_2O + CO \longrightarrow$$

$$HO\overset{O}{\overset{\|}{C}}-R-\overset{O}{\overset{\|}{C}}OCH_2CO_2H + HO_2CCH_2O\overset{O}{\overset{\|}{C}}-R-\overset{O}{\overset{\|}{C}}OCH_2CO_2H \quad (2)$$

wherein $$R\left(\overset{O}{\overset{\|}{C}}OH\right)_2$$

represents the dicarboxylic acid reactant.

Illustrative α-acyloxyacetic acid product includes α-formyloxyacetic acid, α-acetoxyacetic acid, α-(trichloroacetoxy) acetic acid, bis-(carboxymethyl) adipic acid ester, monocarboxy methyl adipic acid ester, α-propionyloxyacetic acid, α-butyryloxyacetic acid, α-valeroyloxyacetic acid, α-hexanoyloxyacetic acid, α-decanoyloxyacetic acid, α-benzoyloxyacetic acid, α-(p-toluoyloxy)-acetic acid, bis-(carboxymethyl) phthalic acid ester, monocarboxymethyl phthalic acid ester, etc.

The reactant conditions

The reactants employed in the process of the invention are generally contacted in the molar ratios defined by the stoichiometry of Equation 1. That is, the molar ratio of carboxylic acid to formaldehyde is substantially equimolar (e.g., 1.5:1 to 1:1.5) and the molar ratio of carbon monoxide to formaldehyde is substantially equimolar (e.g., 1.5:1 to 1:1.5). For carboxylic acids having two carboxy groups, an additional molar amount of formaldehyde and carbon monoxide may be employed, e.g., molar ratios of carboxylic acid to formaldehyde or carbon monoxide are about 1.5:2 to 1:2.5. However, an excess of any reactant is suitably employed. For example, in some modifications of the process, it is desirable to employ excess carboxylic acid and/or carbon monoxide as reaction diluents. Accordingly, molar ratios of carboxylic acid to formaldehyde of from 10:1 to 1:10 are satisfactory, although molar ratios of from 5:1 to 1:2 are preferred; and molar ratios of carbon monoxide to formaldehyde of from 10:1 to 1:10 are satisfactory, although molar ratios of from 5:1 to 1:1 are preferred.

The process of the invention is conducted in a fluid phase, i.e., either in the gaseous or liquid phase, in the presence or in the absence of an inert reaction diluent. Suitable inert normally liquid diluents are hydrocarbons free from aliphatic unsaturation such as hexane, heptane, octane, decane, cyclohexane, benzene, toluene and xylene. Suitable normally gaseous diluents are nitrogen, hydrogen, argon, helium, methane and ethane. As indicated above, in some modifications of the process, a portion of the carbon monoxide or carboxylic acid reactant suitably serves as the reaction diluent. When diluent is employed, up to about 50 moles per mol of formaldehyde reactant are satisfactory. The process is suitably conducted in an inert reaction environment so that the presence of reactive materials such as oxygen is desirably avoided.

In certain modifications wherein a supported rhodium catalyst is employed, the reaction is effected in a continuous manner as by passing a mixture of the reaction components and the remaining catalyst components through a reactor in which the supported transition metal catalyst is maintained.

The process of the invention is conducted at moderate temperatures and pressures. Suitable reaction temperatures varying from about 100° C. to 300° C. are satisfactory and reaction temperatures varying from about 150° C. to 250° C. are preferred. The process is conducted at or above atmospheric pressure, and pressures from about 1 atmosphere to about 200 atmospheres are satisfactory.

At the conclusion of the reaction, the product mixture is separated and the α-acyloxyacetic acid product is recovered by conventional means such as fractional distillation. Unreacted reaction components are suitably recycled for further use in the process. In addition to the α-acyloxyacetic acid product, the process of the invention also produces major amounts of methylene bisacetate

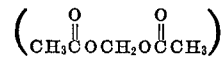

and/or oxymethylene bisacetate

Examples 1–9

The preparation of α-alkanoyloxyacetic acids (α-acetoxyacetic acid and α-propionyloxyacetic acid) was carried out by the following procedure.

An autoclave was charged with the rhodium catalyst, sealed and flushed with nitrogen followed by carbon monoxide. The alkanoic acid, iodide promoter, formaldehyde were then added to the autoclave. The autoclave was sealed and pressured with carbon monoxide and rapidly heated to reaction temperature.

After maintaining the reaction at reaction temperature for the indicated reaction time, the autoclave was opened and the reaction mixture analyzed by nuclear magnetic resonance spectroscopy, infrared spectroscopy and gas-liquid chromatography.

The reactant, the catalyst components, the reaction conditions employed, and the yield of products (based on trioxane charged) are tabulated in Table I.

TABLE I

| | Run number | | | | | | | | |
|---|---|---|---|---|---|---|---|---|---|
| | 1 | 2 | 3 | 4 | 5 | 6 | 7 | 8 | 9 |
| 1,3,5-trioxane (mol) | 0.167 | 0.167 | 0.167 | 0.125 | 0.167 | 0.167 | 0.167 | 0.167 | 0.187 |
| Alkanoic acid (2 mols) | Acetic | Acetic | Acetic | Acetic (0.5 mol) | Propionic (1.62 mol) | Acetic | Acetic | Acetic | Acetic |
| Iodide promoter (0.05 mol) | HI | CH₃I | HI | CH₃I (0.0125 mol) | CH₃I | None | CH₃I | HI | H₂SO₄ |
| Rh(CO)₂Cl | 0.001 | 0.001 | 0.001 | 0.00025 | 0.001 | 0.001 | None | None | None |
| Carbon monoxide (initial p.s.i.g) | 1,000 | 1,000 | 1,000 | 100 | 1,000 | 1,000 | 1,000 | 1,000 | 1,000 |
| Temperature (° C.) | 150 | 150 | 125 | 140 | 150 | 150 | 150 | 150 | 150 |
| Time (hours) | 5 | 5 | 18 | 17.5 | 5 | 5 | 5 | 5 | 5 |
| Percent yield α-acetoxyacetic acid | 68 | 42 | 55 | 8 | 47 (α-propionyloxy acetic) | 0 | 0 | 45 | 23 |
| Percent yield methylene bisacetate | 4 | 9 | 6 | 22 | 15 (methylene bispropionate) | 6 | 6.5 | 3 | 5 |
| Percent yield oxymethylene bisacetate | | | | 33 | | 0 | 0 | 0 | 6 |

The process of the invention is carried out by intimately contacting the formaldehyde, carboxylic acid and carbon monoxide in the presence of the transition metal catalyst and iodide promoter. A variety of procedures can be employed for contacting the reaction components with the catalyst system. In one modification, the entire amounts of formaldehyde, carboxylic acid, carbon monoxide and catalyst components are charged to an autoclave or similar pressure reactor and maintained at reaction conditions for the desired reaction period. In another modification an active catalyst system is initially preformed by contacting at elevated temperature the rhodium compound, carbon monoxide, and iodide promoter in a suitable solvent and subsequently adding the remaining reaction components.

What is claimed is:

1. A process of producing α-acyloxyacetic acid which comprises reacting formaldehyde, carbon monoxide and a carboxylic acid selected from alkanoic acids of 1 to 10 carbon atoms, dialkanoic acids of 3 to 10 carbon atoms, haloalkanoic acids of 1 to 10 carbon atoms and 1 to 5 halogens of atomic number 9 to 35 and hydrocarbon aromatic acids of 7 to 10 carbon atoms and 1 to 2 carboxy groups in the presence of catalytic amounts of a rhodium compound and an iodide promoter, the molar ratio of carboxylic acid to formaldehyde being from about 1:10 to 10:1, at a temperature of from about 50° C. to 300° C. and a carbon monoxide partial pressure of from about 1 p.s.i.a. to 2000 p.s.i.a.

2. The process of claim 1 wherein the carboxylic acid is an alkanoic acid.

3. The process of claim 2 wherein the rhodium compound is a rhodium carbonyl halide.

4. The process of claim 2 wherein the alkanoic acid has from 2 to 6 carbon atoms.

5. The process of claim 4 wherein the molar ratio of carbon monoxide to formaldehyde is from 5:1 to 1:1 and the molar ratio of alkanoic acid to formaldehyde is 5:1 to 1:2.

6. The process of claim 4 wherein the reaction temperature is 100 to 250° C.

7. The process of claim 6 wherein the alkanoic acid is acetic acid or propionic acid.

8. The process of claim 7 wherein the rhodium compound is $RH(CO)_2Cl$ dimer.

9. The process of claim 7 wherein the formaldehyde is provided in the form of trioxane.

10. The process of claim 4 wherein the iodide promoter is hydroiodic acid or an alkyl iodide.

11. The process of producing α-alkanoyloxyacetic acid which comprises reacting formaldehyde, carbon monoxide and an alkanoic acid of 1 to 10 carbon atoms in the presence of catalytic amounts of a rhodium compound and hydroiodic acid, the molar ratio of alkanoic acid to formaldehyde being from about 1:10 to 10:1, at a temperature of from about 50° C. to 300° C. and a carbon monoxide partial pressure of from about 1 p.s.i.a. to 2000 p.s.i.a.

12. The process of claim 11 wherein the alkanoic acid is acetic acid.

References Cited
UNITED STATES PATENTS 2,211,624   8/1940   Loder et al. _____ 260—494

VIVIAN GARNER, Primary Examiner

U.S. Cl. X.R.

260—408, 410.9 R, 475 R, 476 R, 485 R, 487